(12) United States Patent
Kaler et al.

(10) Patent No.: US 7,185,319 B2
(45) Date of Patent: *Feb. 27, 2007

(54) DEBUGGING DISTRIBUTED APPLICATIONS

(75) Inventors: Christopher G. Kaler, Sammamish, WA (US); Oliver J. Sharp, Seattle, WA (US); Erik B. Christensen, Seattle, WA (US); Dale A. Woodford, Bellevue, WA (US); Luis Felipe Cabrera, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 730 days.

This patent is subject to a terminal disclaimer.

(21) Appl. No.: 10/191,841

(22) Filed: Jul. 9, 2002

(65) Prior Publication Data

US 2004/0010778 A1 Jan. 15, 2004

(51) Int. Cl.
*G06F 9/44* (2006.01)
(52) U.S. Cl. .................. 717/124; 717/127; 717/130
(58) Field of Classification Search ................ 717/103, 717/124, 127, 130; 709/201, 202, 224, 226; 719/313, 314, 317; 705/59, 1; 712/28; 714/38

See application file for complete search history.

(56) References Cited

U.S. PATENT DOCUMENTS

| | | | | |
|---|---|---|---|---|
| 5,630,049 | A * | 5/1997 | Cardoza et al. ................ | 714/25 |
| 5,781,787 | A * | 7/1998 | Shafer et al. .................. | 712/28 |
| 6,188,995 | B1 * | 2/2001 | Garst et al. .................... | 705/59 |
| 6,637,024 | B1 * | 10/2003 | Johnson et al. ............. | 717/124 |
| 6,748,583 | B2 * | 6/2004 | Aizenbud-Reshef et al. ..... | 717/127 |
| 7,039,014 | B1 * | 5/2006 | Krishnamurthy et al. ... | 370/244 |
| 2002/0087952 | A1 * | 7/2002 | Tabe et al. ................... | 717/124 |
| 2002/0156894 | A1 * | 10/2002 | Suorsa et al. ............... | 709/226 |
| 2004/0078685 | A1 * | 4/2004 | Glass .......................... | 714/38 |
| 2005/0004804 | A1 * | 1/2005 | English ......................... | 705/1 |

OTHER PUBLICATIONS

"Experiences with building distributed debuggers", Michael S. Meier, Kevan L. Miller, Donald P. Pazel, Josyula R. Rao, James R. Russell, Jan. 1996, Proceedings of the SIGMETRICS symposium on Parallel and distributed tools, pp. 70-79.*

"Requirements for and Evaluation of RMI Protocols for Scientific Computing", M. Govindaraju, A. Slominski, V. Choppella, R. Bramley, D. Gannon, Nov. 2000, Proceedings of the 2000 ACM/IEEE conference on Supercomputing, pp. 1-26.*

(Continued)

*Primary Examiner*—Wei Zhen
*Assistant Examiner*—Philip Wang
(74) *Attorney, Agent, or Firm*—Workman Nydegger

(57) ABSTRACT

Debug controls for debugging a distributed application are included in messages that are also used by the distributed application to transport data. A debug initiator causes debug controls to be inserted in the header portion of a message that is being transported across a distributed system. The debug initiator may insert debug controls directly or may cause a message router that receives the message to merge debug controls into the message. The message router may receive debug controls from the debug initiator or from configuration files that are maintained at the message router. The message, which now includes distributed application data and debug controls, is routed to a message recipient. The message recipient accesses the message to identify debug functions that are to be performed at the message recipient. The message recipient performs at least one of the identified debug functions.

75 Claims, 6 Drawing Sheets

OTHER PUBLICATIONS

Using XML to Specify A Trace Format for MPI Programs, S. Huband, and C. McDonald, Journal of Research and Practice on Information Technology, Publ. by Australian Comput. Soc., Australia, May 2001, vol. 33, No. 2, pp. 133-145.

Adaptive Distributed Breakpoint Detection and Checkpoint Space Reduction in Message Passing Programs, Chyi-Ren Dow and Cheng-Min Lin, Computers and Artificial Intelligence, Publ. by Slovak Acad. Sci., Slovakia, 2000, vol. 19, No. 6, pp. 547-568.

Net-DBX: A Java-Powered Tool for Interactive Debugging of MPI Programs Across the Internet, N. Neophytou and P. Evripidou, Euro-Par'98 Parallel Processing. 4th International Euro-Par Conference Proceedings, Publ. by Springer-Verlag, Berlin, Germany, 1998, pp. 181-189.

Debugging Message Passing Programs using Invisible Message Tags R. Wismuller, Recent Advances in Parallel Virtual Machine and Message Passing Interface. 4th European PVM/MPI Users' GroupMeeting. Proceedings, Publ by Springer-Verlag, Berlin, Germany, 1997, pp. 295-302.

Distributed Breakpoint Detection in Message -Passing Programs, L.C. de A. Drummond and V.C. Barbosa, Journal of Parallel and Distributed Computing, Publ. by Academic Press, USA, Dec. 15, 1996, vol. 39, No. 2, pp, 153-167.

A Step Towards Neutral Debugging of Distributed Applications, S. Chaumette, Parallel Computing: Trends and Applications. Proceedings of the International Conference, Publ. by Elsevier, Amsterdam, Netherlands, 1994, Par. Co. 93, pp. 273-280.

Neutral Debugging Using Grafts S. Chaumette, Information and Software Technology, UK, Jul. 1994, vol. 36, No. 7, pp. 465-470.

* cited by examiner

DEBUGGING DISTRIBUTED APPLICATIONS

BACKGROUND OF THE INVENTION

1. The Field of the Invention

The present invention relates to debugging distributed applications. More specifically, the present invention relates to systems, methods, and computer-program products for including debug controls along with distributed application data in messages that are utilized by distributed applications during normal operation.

2. Background and Relevant Art

Computer systems and related technology affect many aspects of society. Indeed, the computer system's ability to process information has transformed the way we live and work. Computer systems now commonly perform a host of tasks (e.g. information management, scheduling, and word processing) that prior to the advent of the computer system were typically performed manually. More recently, computer systems have been coupled to one another to form computer networks over which computer systems may transfer data electronically.

Initially, a significant portion of data transfer on computer networks was performed using specific applications (e.g. electronic mail applications) to transfer data files from one computer system to another. For example, a first user at a first networked computer system could electronically mail a data file to a second user at a second networked computer system. However, program execution (e.g. running the electronic mail application) and data access (e.g. attaching the data file to an electronic mail message) were essentially completely performed at a single computer system (e.g. at the first computer system). That is, a computer system would execute programs and access data from storage locations contained in the computer system. Thus, being coupled to a network would not inherently give one networked computer system the ability to access data files from another networked computer system. Only after a user actively sends a data file to a computer system could the computer system access the data file.

However more recently, as the availability of higher-speed networks has increased, many computer networks have shifted towards a distributed architecture. Such networks are frequently referred to as distributed systems. Distributed systems function to "distribute" program execution and data access across the modules of a number of different computer systems coupled to a network.

In a distributed system, modules connected to a common network interoperate and communicate between one another in a manner that may be transparent to a user. For example, a user of a client computer system may select an application program icon from a user-interface thereby causing an application program stored at a server computer system to execute. The user-interface may indicate to the user that the application program has executed, but the user may be unaware, and in fact may not care, that the application program was executed at the server computer system. The client computer system and the server computer system may communicate in the background to transfer the user's commands, program responses, and data between the client computer system and the server computer system.

Often, a distributed system includes a substantial number of client computer systems and server computer systems. In many cases, computer systems of a distributed system may function both as client computer systems and server computer systems, providing data and resources to some computer systems and receiving data and resources from other computer systems. Each computer system of a distributed system may include a different configuration of hardware and software modules. For example, computer systems may have different types and quantities of processors, different operating systems, different application programs, and different peripherals. Additionally, the communications path between computer systems of a distributed system may include a number of networking components, such as, for example, firewalls, routers, proxies and gateways. Each networking component may include one or more software or hardware modules that condition and/or format portions of data so as to make them accessible to other modules in the distributed system.

In some cases, "distributed applications" are specifically designed for execution in a distributed system. Due to the number of modules that may be included in a distributed system, properly designing and configuring distributed applications is significantly more complex than designing and configuring applications for execution at single computer system. Each portion of a distributed application, in addition to being configured for proper operation in a stand-alone mode, must also be configured to appropriately communicate with other portions of the distributed application, as well as other modules in associated distributed systems. As such, distributed applications often require "debugging" to help ensure desired operation. Debugging may be performed to find and remove defects (or "bugs") that might cause data corruption or cause modules of the distributed system to crash.

One common debugging technique used to debug distributed applications is to physically attach a debugging console to a computer system that contains a portion of a distributed application requiring debugging. The debugging console interacts with the distributed application to help determine if input data to and output data from the distributed application are correct and, in the event that data is not correct, provides some indication of why the data is not correct. However, in some cases a user desiring to perform debugging operations may not have physical access to the computer system containing the portion of the distributed application that needs debugging and thus no debugging console can be attached. For example, a user at a client computer system in the United States may desire to debug a portion of a distributed application running on a server computer system in Japan, however the user may have no easy way to get to the server computer system.

Another approach to debugging distributed applications is to create a "remote" debugging session. In some cases, remote debugging sessions are supported by operating systems through the use of "remote shells," which allow a user to create processes on remote computer systems. In other cases, specials programs may "attach" a debugger to a remote module through the use of a debugging agent and a specialized protocol. In either case, a user may attempt to debug a module of a computer system by accessing the computer system remotely. That is, a user physically located at a first computer system creates a session on a second computer system and is able to use the session to cause debugging commands to execute at the second computer system.

It may be that a distributed system is configured in a way that allows a user to easily create remote debugging sessions and access modules in remote computer systems. However many times, and perhaps more frequently, modules of a distributed system are protected by security mechanisms, such as, for example, firewalls that block some types of communication. That is, security mechanisms may be configured so that communications between portions of a distributed application are allowed, but other communications that may be seen as a security risk are blocked by the security mechanisms. Since debugging operations may interact with modules in ways that could be destructive, security mechanisms frequently interpret requests for remote debugging sessions as potentially harmful communications and thus block the communications.

Even if a debugging console is attached or a remote debugging session is established to a computer system, current debugging approaches are primarily directed at debugging code contained in the computer system. That is, these approaches may be used to debug operations that occur at the computer system. However, after a distributed application places data in a message for transport to another module, a debugging console or remote debugging session has no way to determine what happens to the data.

Further, current debugging approaches offer little control over debug functions that are performed and the amount of data that is returned when debugging a distributed application. Some approaches have standardized debugging operations with limited ability to configure the operations for specific distributed systems. This may result in too much data, some of which may not even be useful for debugging a particular distributed application, being returned during a debugging session. Lack of control over the amount of data that is returned may result in a "probe effect," where the amount of data returned is so great that performance of a distributed system is impacted.

Therefore, what are desired are systems, methods, and computer program products, for more efficiently and accurately debugging distributed applications.

BRIEF SUMMARY OF THE INVENTION

The principles of the present invention provide for debugging distributed applications by including debug controls along with distributed application data in messages that are utilized by distributed applications during normal operation. The principles of the present invention may be practiced in a distributed system environment that includes a number of message processors (e.g. computer systems, routers, gateways, etc.), each of which may perform message operations (e.g. initiating, accessing, modifying or routing a message) on messages that are transported across the distributed system.

In one example embodiment, a message that originated at a message initiator (e.g. a client computer system) is accessed. Such a message may be a message that includes distributed application data for a distributed application that is currently running on a distributed system. Accessing a message may include accessing data included in the body and/or header portion of a message, such as, for example, specific header blocks and/or specific body blocks of a Simple Object Access Protocol ("SOAP") envelope. In some cases, a "debug initiator," which may also be a message processor, accesses the message.

Debug controls, that will cause one or more message recipients (e.g. other message processors) to perform debugging functions indicated by the debug controls, are inserted into the message. In some cases, a debug initiator may receive the message and subsequently insert debug controls into the message. In other cases, a debug initiator may send a first message to a message router thereby causing the message router to insert debug into a second message that is received at the message router.

Debug controls may be inserted in messages that are transported using SOAP. A "debug" header may be defined, which includes debug condition attributes, debug action attributes, and/or debug response attributes. A message processor (e.g. a debug initiator) may cause a debug header with the appropriate attributes to be included in a message or may modify existing debug headers. Any number and combination of debug attributes may be inserted into a message, as many or as few are as appropriate for debugging a particular distributed application. Thus, a user attempting to debug a distributed application may have increased control over the debugging functions that will be performed and the amount of data that is returned. In alternate embodiments, debug controls may be included in other types of messages where information is passed in a standardized manner, such as, for example, a Java™-based distributed system. Java™ is a registered trademark of Sun Microsystems, Inc. in the United States and other countries.

A debug condition attribute may represent a condition that causes a debug action and/or a debug response to be contingent on the occurrence of an event, for example, that a message processor is experiencing specified load conditions or that a request for data be completed. If the event occurs, the condition is satisfied and the performance of a debug action may result. If the event does not occur, the condition is not satisfied and the performance of debug action does not result.

A debug action attribute represents an action that is performed at a message processor to cause the message processor to alter the execution of a distributed application in a specific manner. For example, performing a debug action may suspend execution of, or "break," a distributed application so that variable values may be verified.

A debug response attribute represents a response that occurs in response to a debug action being performed. For example, in response to a break in execution a distributed application can abort, thus terminating any further execution, or can continue execution.

The message, which now includes debug controls, is routed to a message processor designated in the message. This may include routing a message to a message processor that is to perform a debugging function indicating by the inserted debug controls. Thus, debug controls may "flow" to the message processor where a debug function is to be performed.

In a second example embodiment, a first message is received at a message router (which may be a message processor). The first message may include distributed application data associated with a distributed application that is currently operating in the distributed system. The message router receives debug controls that will cause one or more message recipients (e.g. other message processors) to perform debug functions indicated by the debug controls. Debug controls may be included in a second message (e.g. a SOAP message) that is received from a debug initiator. Likewise, computer-readable media containing debug controls may be maintained at the message router. When a processed message matches specified attach conditions, the message router may attach debug controls to the first message that are contained in computer-readable media or that were received in the second message.

The message router merges debug controls into the first message. Merging debug controls may include inserting debug controls into a header portion of the first message. The message router may insert debug controls into an existing debug header or may insert a new debug header that contains debug controls. Merging debug controls into existing messages (e.g. those including distributed application data) allows debug controls to be expressed without changing a distributed application. The first message is routed to a message processor designated in the message.

The routed message, which includes distributed application data and debug controls, is then received at a current message recipient (e.g. a server computer system). The current message recipient accesses the message to identify potential debug functions to be performed at the current message recipient. This may include the current message recipient processing debug controls, such as, for example, debug conditions that indicate debug actions and debug responses should be performed. At least one of the potential debug functions is performed at the current message recipient. This may include performing a debug action (e.g. causing a break in execution) and/or a debug response (e.g. aborting execution). The message is then routed to a message processor designated in the message. This can include routing a message to another message processor that is to perform debug functions indicated in the message. The current message recipient may also route the results of performed debugging functions to the debug initiator.

By including debug controls in messages that are already in use by distributed applications, debugging is essentially "built into" an existing messaging infrastructure. Since debugging controls may be included in messages that are protocol independent, such as, for example, SOAP envelopes, debugging controls may pass through firewalls an/or other security mechanisms. Further, since there is increased control over the amount of data that is returned when debugging a distributed application, the probe effect may be reduced.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
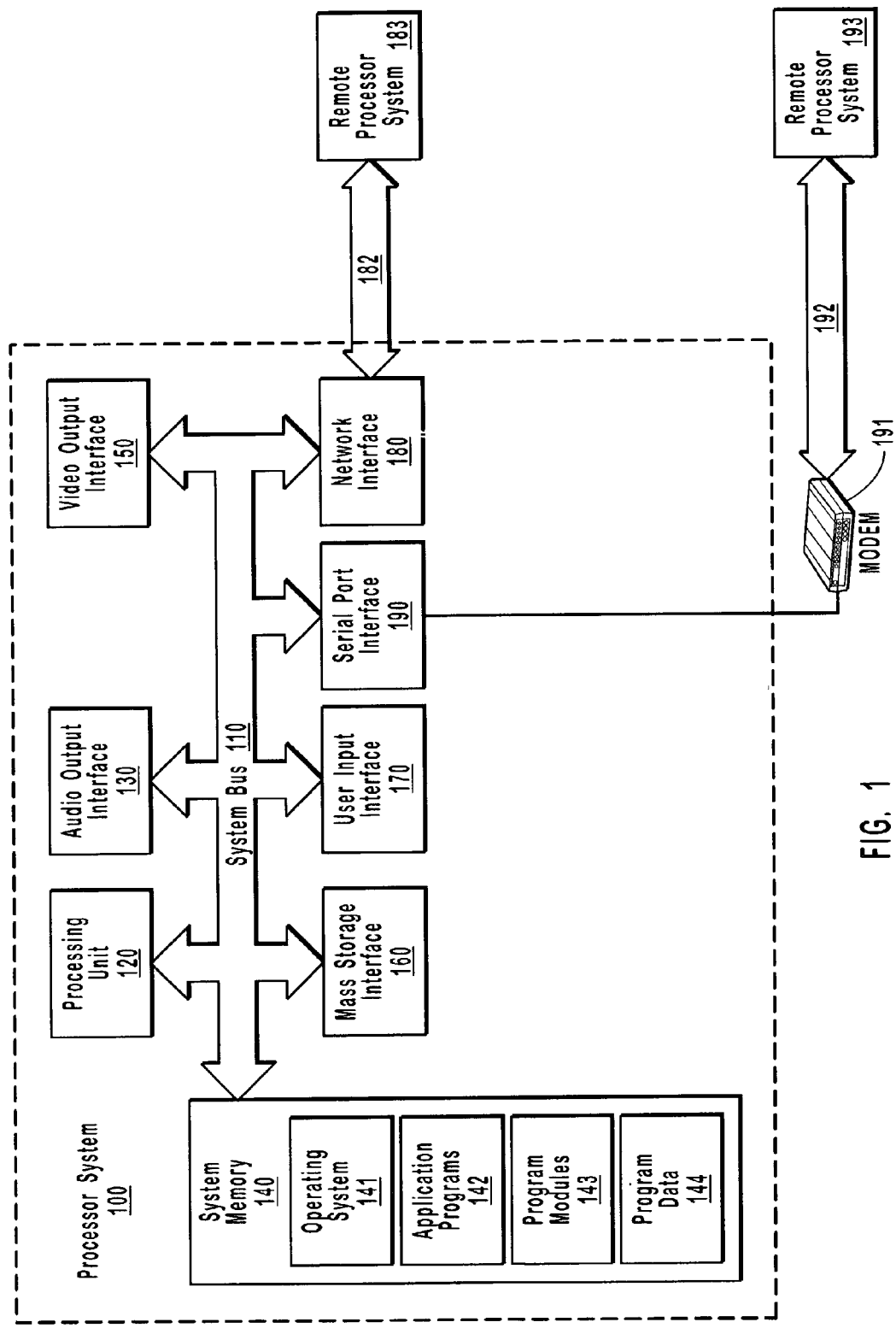
FIG. 1 illustrates an example of a processor system that provides a suitable operating environment for the present invention.

The present invention extends to systems, methods, and computer program products for debugging distributed applications by including debug controls along with distributed application data in messages that are utilized by distributed applications during normal operation. Messages associated with distributed applications may be transported between the message processors of a distributed system. One or more of the message processors may insert debug controls into a message to cause other message processors to perform debugging functions. Such debugging functions may include causing execution of a distributed application to be suspended or aborted.

The embodiments of the present invention may comprise a general-purpose or special-purpose computer system including various computer hardware components, which are discussed in greater detail below. Embodiments within the scope of the present invention also include computer-readable media for carrying or having computer-executable instructions, computer-readable instructions, or data structures stored thereon. Such computer-readable media may be any available media, which is accessible by a general-purpose or special-purpose computer system.

By way of example, and not limitation, such computer-readable media can comprise physical storage media such as RAM, ROM, EPROM, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computer system.

In this description and in the following claims, a "network" is defined as any architecture where two or more computer systems may exchange data with each other. When information is transferred or provided over a network or another communications connection (either hardwired, wireless, or a combination of hardwired or wireless) to a computer system or computer device, the connection is properly viewed as a computer-readable medium. Thus, any such connection is properly termed a computer-readable medium. Combinations of the above should also be included within the scope of computer-readable media. Computer-executable instructions comprise, for example, instructions and data which cause a general-purpose computer system or special-purpose computer system to perform a certain function or group of functions.

In this description and in the following claims, a "computer system" is defined as one or more software modules, one or more hardware modules, or combinations thereof that work together to perform operations on electronic data. For example, the definition of computer system includes the hardware components of a personal computer, as well as software modules, such as the operating system of the personal computer. The physical layout of the modules is not important. A computer system may include one or more computers coupled via a computer network. Likewise, a computer system may include a single physical device (such as a mobile phone or Personal Digital Assistant "PDA") where internal modules (such as a memory and processor) work together to perform operations on electronic data.

Those skilled in the art will appreciate that the invention may be practiced in network computing environments with many types of computer system configurations, including routers, gateways, firewalls, proxies, personal computers, laptop computers, hand-held devices, multi-processor systems, microprocessor-based or programmable consumer electronics, network PCs, minicomputers, mainframe computers, mobile telephones, PDAs, pagers, and the like. The invention may also be practiced in distributed system environments where local and remote computer systems, which are linked (either by hardwired links, wireless links, or by a combination of hardwired or wireless links) through a communication network, both perform tasks. In a distributed system environment, program modules may be located in both local and remote memory storage devices.

In this description and in the following claims, a "message processor" is defined as one or more modules (hardware and/or software) that operate together to perform one or more messaging operations on messages that are transported in a distributed system. Messaging operations may include, for example, initiating a message, accessing a message, appending information to a message, sending a message, receiving a message, routing a message, removing information from a message, and terminating a message. Each message processor in a distributed system may include the functionality to perform any of the messaging operations.

In this description and in the following claims, a message processor may be referred to by a particular messaging operation, such as, for example, "initiating", "receiving", and so forth, that is performed at the message processor. When such references are made, a descriptive term representing the particular messaging operation may be substituted for the word "processor", such as, for example, message "router," message "recipient," message "initiator", and so forth, when describing the message processor. This is for descriptive purposes only so as to help distinguish between multiple message processors that may be acting together in a given context. However, this is not meant to imply that a message processor is limited to only the referenced messaging operation used to describe the message processor.

Initiating a message may include generating data for the body and/or header portion of a message. Accessing a message may include processing data included in the body and/or header portion of a message. Appending data to a message may include inserting and/or merging data into the body and/or header portion of a message.

Routing a message includes sending, receiving, and/or determining where to send a message. For example, a message router may "route" a message from a sending message processor to a receiving message processor. The message router may receive the message from the sending message processor, access addressing information from the header portion of the message, and subsequently send the message to the receiving message processor. A message router may also route a message to itself. That is, a message router may determine that a message should be sent to the message router.

Removing data from a message includes removing data from the body and/or header portion of a message. Terminating a message includes removing the message from the distributed system.

In this description and in the following claims, reference may be made to a "debug initiator." It should be understood that a debug initiator is a message processor and may include the functionality to perform any messaging operations. A debug initiator causes debug functions to be performed in the distributed system.

In this description and in the following claims, a "debugging agent" is defined as a module that processes debug controls and may be included in a message processor. For example, a debugging agent may identify if certain debug conditions are met, perform associated debug actions, and perform associated debug responses. A debugging agent may also determine, based on attach conditions, when debug controls should be inserted or merged into a message.

In this description and in the following claims, a "logical communication link" is defined as any communication link that enables the transport of electronic data between two message processors. The actual physical representation of a communication path between two entities is not important and may change over time. A logical communication link can include portions of a system bus, a local area network, a wide area network, the Internet, combinations thereof, or portions of any other paths that facilitates the transport of electronic data. Logical communication links can include hardwired links, wireless links, or a combination of hardwired links and wireless links. In the description of the figures that follow, a logical communication link is represented by an arrow or a solid line. It should be understood that a logical communication link could include any number of message processors, such as, for example, proxies, routers, firewalls, gateways, or computer systems. However to simplify the description, these message processors may not be shown. Logical communication links may also include portions of a Virtual Private Network ("VPN").

FIG. 1 and the following discussion are intended to provide a brief, general description of a suitable computing environment in which the invention may be implemented. Although not required, the invention will be described in the general context of computer-executable instructions, such as program modules, being executed by computer systems. Generally, program modules include routines, programs, objects, components, data structures, and the like, which perform particular tasks or implement particular abstract data types. Computer-executable instructions, associated data structures, and program modules represent examples of the program code means for executing steps of the methods disclosed herein. The particular sequences of such executable instructions or associated data structures represent examples of corresponding acts for implementing the functions described in such steps.

With reference to FIG. 1, a suitable operating environment for the principles of the invention includes a general-purpose computer system in the form of a processor system 100. Processor system 100 may be a message processor that has been adapted to perform the operations disclosed herein.

Processor system 100 includes a user input interface 170 that receives information from an input device, such as, for example, a keyboard, microphone, or mouse. An input device can be coupled to user input interface 170 so as to enable the entry of information. An input device may transfer information over such a coupling in response to preprogrammed data or user manipulation of the input device.

Processor system 100 includes a video output interface 150 that provides a video output signal to external video display devices. Processor system 100 may be integrally positioned with or separate from a video display device, such as, for example, a color or monochrome computer monitor. A video display device can be coupled to video output interface 150 so as to receive a provided video output signal.

Similarly, processor system 100 includes an audio output interface 130 that provides an audio output signal to external audio output devices. Processor system 100 may also be integrally positioned with or separate from an audio system, which may include a speaker or other device capable of emitting sound data. An audio system can be coupled to audio output interface 130 so as to receive a provided audio output signal.

Processor system 100 includes processing unit 120, which allows for complex and flexible general-purpose processing capabilities. Processing unit 120 executes computer-executable instructions designed to implement features of processor system 100, including features of the present invention. Processing unit 120 is coupled to system bus 110, which also interconnects various other system components, including system memory 140.

System memory 140 generally represents a wide variety of volatile and/or non-volatile memories and may include types of memory previously discussed. However, the particular type of memory used in processor system 100 is not important to the present invention. Program code means comprising one or more program modules may be stored in system memory 140. The one or more program modules may include an operating system 141, one or more application programs 142, other program modules 143, and program data 144.

Processor system 100 may include mass storage interface 160, which can read data from and/or write data to a mass storage device, such as, for example, a magnetic disk storage device or optical disk storage device. A mass storage device can be coupled to mass storage interface 160 so as to enable the reading and writing of data. When a mass storage device is coupled to mass storage interface 160, one or more program modules including operating system 141, application programs 142, other program modules 143, and program data 144 may be stored in the mass storage device.

Processor system 100 may be network connectable to networks, such as, for example, an office-wide or enterprise-wide computer network, an intranet and/or the Internet. Processor system 100 may exchange data with external sources, such as, for example, remote processor systems and/or databases over such a network.

Processor system 100 includes network interface 180, through which processor system 100 receives data from external sources and/or transmits data to external sources. As illustrated in FIG. 1, network interface 180 facilitates the exchange of data with remote processor system 183 via logical communication link 182. Logical communication link 182 represents a portion of a network, and remote processor system 183 represents a node of the network.

Likewise, processor system 100 includes serial port interface 190, through which processor system 100 receives data from external sources and/or transmits data to external sources. Serial port interface 190 is coupled to modem 191, which converts data appropriately between serial port interface and logical communication link 192. As illustrated in FIG. 1, serial port interface 190 and modem 191 facilitate the exchange of data with remote processor 193 via logical communication link 192. Logical communication link 192 represents a portion of a network, and remote processor system 193 represents a node of the network.

Alternatively, the exchange of data with external sources may be facilitated by other interfaces, such as, for example, a parallel port, a game port or a universal serial bus ("USB").

It should be understood that the illustrated network connections are merely examples. It would be apparent to one skilled in the art, after having reviewed this description, that a wide variety of network connection techniques may be used to facilitate the exchange of data between processor system 100 and external sources.

While FIG. 1 represents a suitable operating environment for the present invention, the principles of the present invention may be employed in any system that is capable of, with suitable modification if necessary, implementing the principles of the present invention. The environment illustrated in FIG. 1 is illustrative only and by no means represents even a small portion of the wide variety of environments in which the principles of the present invention may be implemented.

In accordance with the present invention, message processor modules and debugging agents as well as associated data, including debugging controls may be stored and accessed from any of the computer-readable media associated with processor systems 100. For example, portions of such modules and portions of associated program data may be included in operating system 141, application programs 142, program modules 143 and/or program data 144, for storage in system memory 140. If a mass storage device is coupled to processor system 100, such modules and associated program data may also be stored in the mass storage device.

In a networked environment, program modules depicted relative to processor system 100, or portions thereof, can be stored in remote memory storage devices, such as, for example, system memory and/or mass storage devices associated with remote processor 183 and/or remote processor 193. Execution of such modules may be performed in a distributed environment as previously described.

Figure 2:
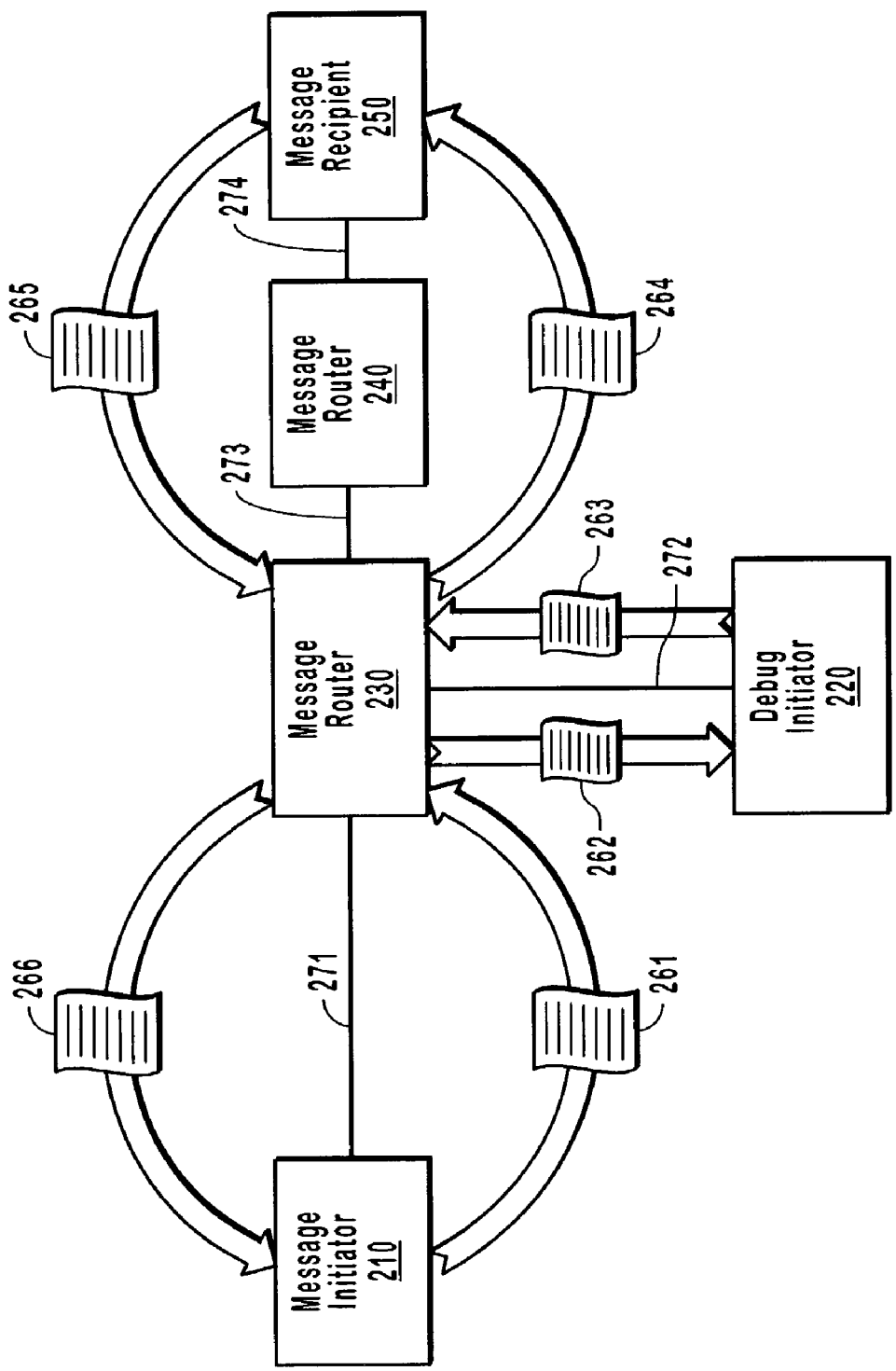
FIG. 2 illustrates an example of some of the functional components that facilitate debugging a distributed application by including debug controls in messages.

FIG. 2 illustrates some of the functional components that can facilitate debugging a distributed application by including debug controls along with distributed application data in messages. FIG. 2 includes message initiator 210, debug initiator 220, message router 230, message router 240, and message recipient 250, which are each message processors. FIG. 2 also includes messages 261 thru 266 that may be passed between the illustrated message processors.

A message can include a header portion and a body portion. The body portion of a message may contain actual distributed application data that is being transported between different portions of a distributed application. The header portion of a message may include one or more header blocks containing control information. Control information designates how data in the body portion of a message should be processed. Control information can be used to designate, for example, that the body portion of a message is encrypted, that the body portion of a message is subject to specified security policies, or that a message should be routed in a specified manner. When a message processor receives a message, the message processor may determine what operations it should perform on the message based on the control information. For example, when a message processor is the ultimate message recipient of the body portion of a message, the message processor may decrypt the data in the body portion of the message. However, when a message processor is merely an intermediary, the message processor may simply route the message to an appropriate destination. Debug controls may be viewed as a type of control information.

Figure 3:
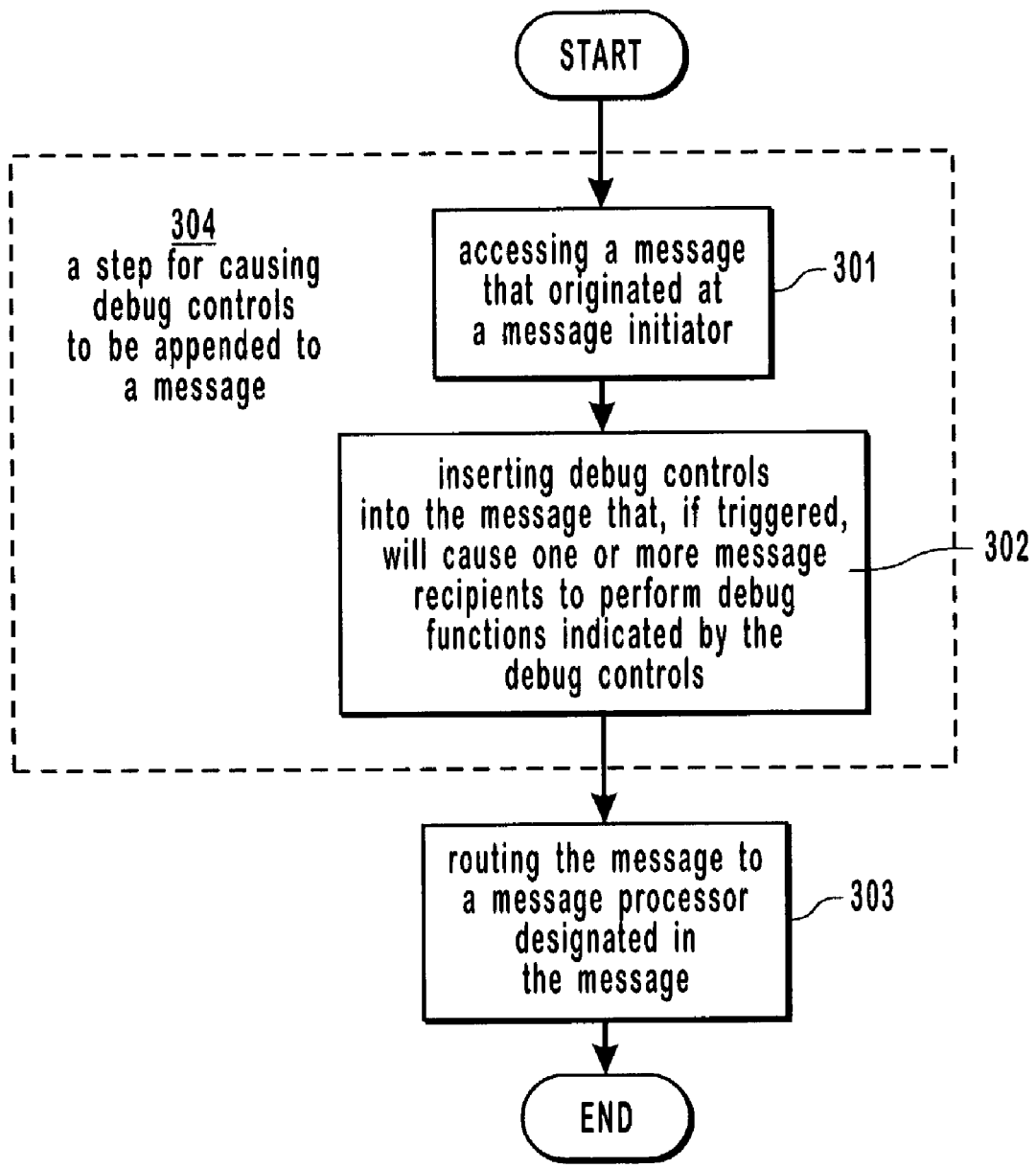
FIG. 3 is a flow diagram illustrating an example of a method for causing debug controls to be inserted into a message.

FIG. 3 is a flow diagram illustrating an example of a method for causing debug controls to be inserted into a message. The method of FIG. 3 will be discussed with reference to the functional components of FIG. 2.

The method in FIG. 3 begins with a functional, result-oriented step for causing debug controls to be appended to a message (step 304). Step 304 may be performed so as to include the debug controls along with distributed application data in the message. Step 304 may include any corresponding acts for accomplishing the result of causing debug controls to be appended to a message. However, in the illustrated example of FIG. 3, the step 304 includes a corresponding act of accessing a message that originated at a message initiator (act 301). Referring to FIG. 2, message initiator 210 initiates message 261 and then routes message 261 to message router 230 via logical communication link 271. Message 261 may be initiated when a portion of a distributed application running at message initiator 210 attempts to communicate with a portion of the distributed application running at another message processor (e.g. message recipient 250).

Debug initiator 220 may access message 261 when it is at message router 230. In that case, debug initiator 220 sends message 263 to message router 230 to gain access to message 261. Message 263 may include instructions on how message router 230 should process message 261. Message router 230 may follow the instructions included in message 263 to access data included in the body portion and/or the header portion of message 261. In one example embodiment (not shown), message initiator 210 and debug initiator 220 are the same message processor. In this one example embodiment, message initiator 210 sends instructions to message router 230 on how message 261 should be processed.

Step 304 includes a corresponding act of inserting debug controls into a message that, if triggered, will cause one or more message recipients to perform debug functions indicated by the debug controls (act 302). In addition to causing message router 230 to access message 261, the instructions included in message 263 may also cause message router 230 to insert debug controls into message 261. Debug controls can be inserted into a message without affecting distributed application data contained in the message and may take the form of control information that is included in the header portion of the message. Debug controls may be contained in a "debug" header that is inserted into message 261.

It should be understood that the present invention is not limited to messaging using any specific transport protocol and format. However, one example protocol that may be used to implement the principles of the present invention is called Simple Object Access Protocol ("SOAP"). The following is an example structure in which the debug controls are included in a unique "<Debug>" header within a SOAP envelope:

| | |
|---|---|
| 1. | <Envelope> |
| 2. | <Header> |
| | . |
| | . |
| | . |
| 3. | <Debug> |
| 4. | DEBUG CONTROLS |
| 5. | </Debug> |
| | . |
| | . |
| | . |
| 6. | </Header> |
| 7. | <Body> |
| 8. | DISTRIBUTED APPLICATION DATA |

-continued

| | |
|---|---|
| 9. | </Body> |
| 10. | </Envelope> |

In this example, the debug controls may include one or more free-form eXtensible Markup Language ("XML") documents. While using the debug header in the header portion of a SOAP envelope allows for the debug controls to be transported in HyperText Transport Protocol ("HTTP") in this example, the debug portion of a message may be provided using other mechanisms as well. There is no requirement that the debug portion of a message be implemented in the context of a SOAP envelope, or that debug controls include an XML document. Debug controls can include computer-executable instructions, computer-readable instructions, and/or scripts, such as, for example, Java™ applets, Java™ scripts, and/or Java™ derived language statements that are embedded in a message. Invoking embedded instructions, applets, or scripts can cause debug functions to be performed. Debug controls can be included in messages that are transferred using Remote Method Invocation ("RMI") protocols, that are transferred in a Common Object Request Broker Architecture ("CORBA") environment, or that are transferred in a Common Language Runtime ("CLR") environment.

In one illustrative example, debug controls include debug conditions, debug actions, and debug responses. If debug controls are included in XML documents, this may take the form of debug condition attributes, debug action attributes, and debug response attributes being associated with a <Debug> header.

A debug condition attribute may represent a condition that causes a debug action and/or a debug response to be contingent on the occurrence of an event. A debug condition can include events associated with the state of a message processor, such as, for example, experiencing specified load conditions, processing a request to perform a specified operation, responding to a request to perform a specified operation, completing a request to perform a specified operation, or receiving a message. A debug condition can also include events associated with timing conditions, such as, for example rates of messages received or relative times at which a message is to be processed. If the event occurs, the condition is satisfied and a debug action and/or debug response may result. If the event does not occur, the condition is not satisfied and a debug action or debug response does not result.

A debug action attribute represents an action that is performed at a message processor to cause the message processor to alter the execution of a distributed application in a specific manner. For example, a message processor may perform a debug action to suspend, or "break," execution of a distributed application so that a message is stalled at the message processor. Table 1 shows a list of some of the debug actions that can be performed at a message processor.

TABLE 1

| Debug Action |
|---|
| break when a specified condition exists |
| break the next time a request is processed |
| break on reply to the next request |
| break when the next request is complete |

A debug response attribute represents a response to the performance of a debug action, such as, for example, a break in execution. In response to a debug action, a message processor may cause a distributed application to abort, thus terminating any further execution, or continue execution. Table 2 shows a list of some of the debug responses that can be performed at a message processor.

TABLE 2

Figure 6:
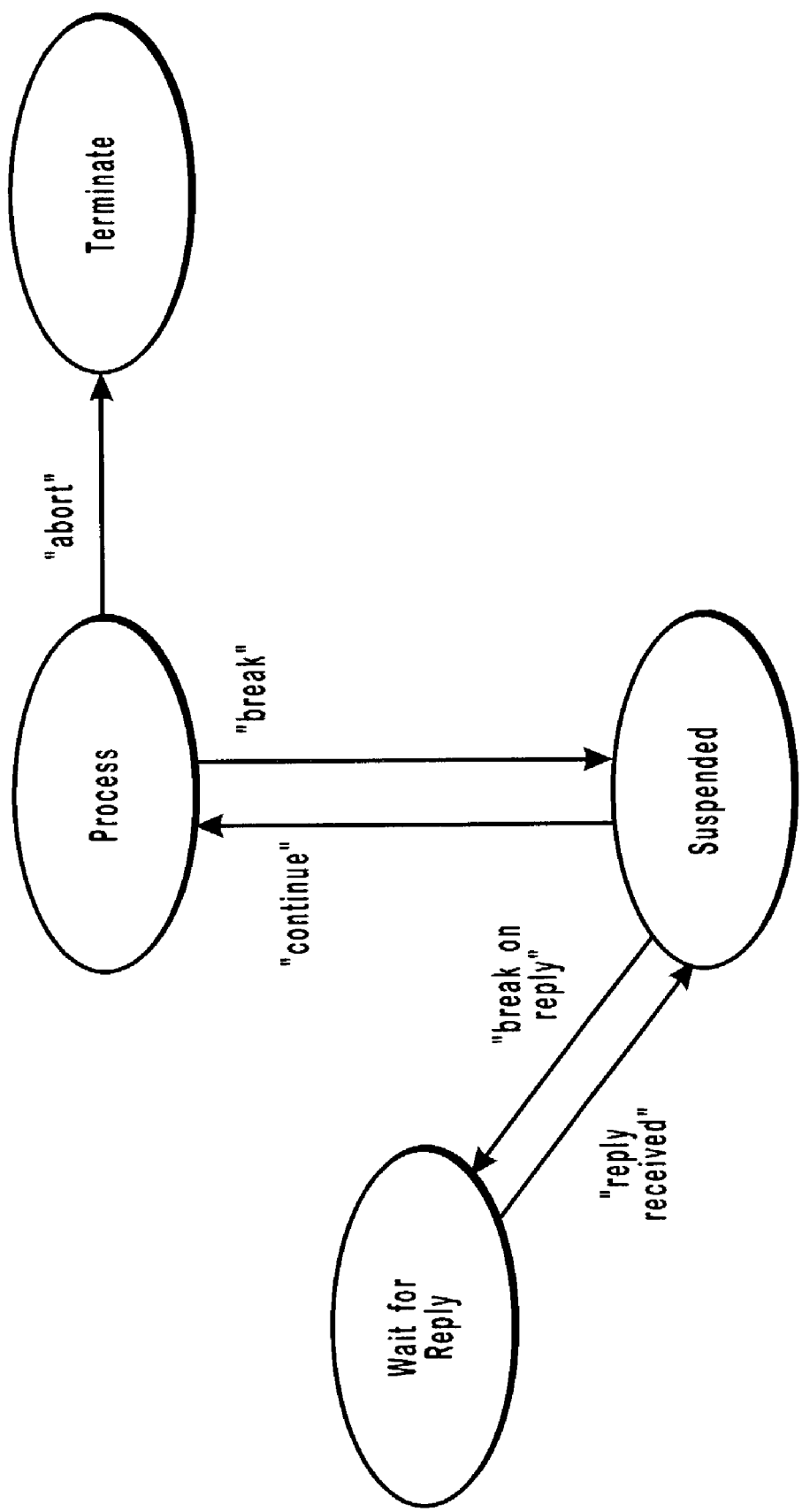
FIG. 6 is a state diagram illustrating an example of transitions between message states when debug actions and debug responses are performed.

Debug Response abort
continue
continue, break on next message
continue, break on reply
continue, break when request is complete FIG. 6 is a state diagram illustrating an example of transitions between message states when debug actions and debug responses are performed. The labels enclosed in the ovals represent different message states. As shown, a message can be in a processed state, a terminated state, a suspended state, or a waiting for reply state. The quoted labels corresponding to arrows between the different message states represent debug actions and debug responses that are performed to cause a transition between message states.

When a message is in a processed state, an "abort" debug response can cause the message to transition into a terminated state. Also, when the message is in a processed state, a "break" debug action can cause the message to transition into a suspended state.

When a message is in a suspended state, a "continue" debug response can cause the message to transition into a processed state. Also, when the message is in a suspended state, a "break on reply" debug action can cause the message to transition into a wait for reply state.

When a message is in a wait for reply state, a "reply received" debug response can cause the message to transition into a suspended state.

The "break on next message" debug action (not shown in FIG. 6) can cause a first message to transition from a processed state to a suspended state when a second message is received.

The "break when request is complete" debug action (not shown in FIG. 6) can cause a message to transition from a processed state to a suspended state when a request made by the message is complete.

It should be understood that the described debug conditions, debug actions, and debug responses and the listed debug actions and debug responses are illustrative only. It would be apparent to one skilled in the art, after having reviewed this description, that a wide variety of debug conditions may be used to cause a debug action and/or a debug response to be contingent on the occurrence of an event when implementing the principles of the present invention. Further, it would be apparent to one skilled in the art, after having reviewed this description, that a wide variety of debug actions and debug responses, in addition to those described and/or listed, may be used when implementing the principles of the present invention.

In some embodiments, a debugging agent contained in message router 230 monitors messages that are received and/or initiated at message router 230. In response to certain attach conditions (e.g. receiving message 263) being satisfied, the debugging agent causes debug controls to be inserted into message 261. Attach conditions may include, for example, that it be a specified time of day or day of the week, that a message processor associated with the debugging agent be experiencing specified load conditions, that the debugging agent receive a message that has taken a specified number of hops, or that a message matches a specific pattern.

In other embodiments, the debugging agent allows debug initiator 220 to intercept the message 261. For example, the debugging agent may modify routing information included in the header portion of message 261 to cause message 262 to be sent to debug initiator 220 via logical communication link 272. In that case, message 262 may be essentially identical to message 261. Debug initiator 220 then accesses message 262 and inserts debug controls into message 262. Debug initiator 220 may also modify routing information to route distributed application data contained in message 261 to its original destination. Debug initiator 220 then sends message 263, which now includes the debug controls, to message router 230 via logical communication link 272.

The message 263, which has the same distributed application data in the body portion as message 261 had, is then routed to a message processor designated in the message (act 303). This can include routing a message to a message processor that is to perform a debug function indicated by the inserted debug controls. Thus, debug controls may "flow" with distributed application data to the message processor where a debug function is to be performed.

In FIG. 2, this may include message router 230 routing message 264 to message recipient 250. Message 264 may include distributed application data that was contained in message 261 along with debug controls that were caused to be inserted by debug initiator 220. Message 264 may be routed from message router 230 to message router 240 via logical communication link 273 and then from message router 240 to message recipient 250 via logical communication link 274.

Figure 4:
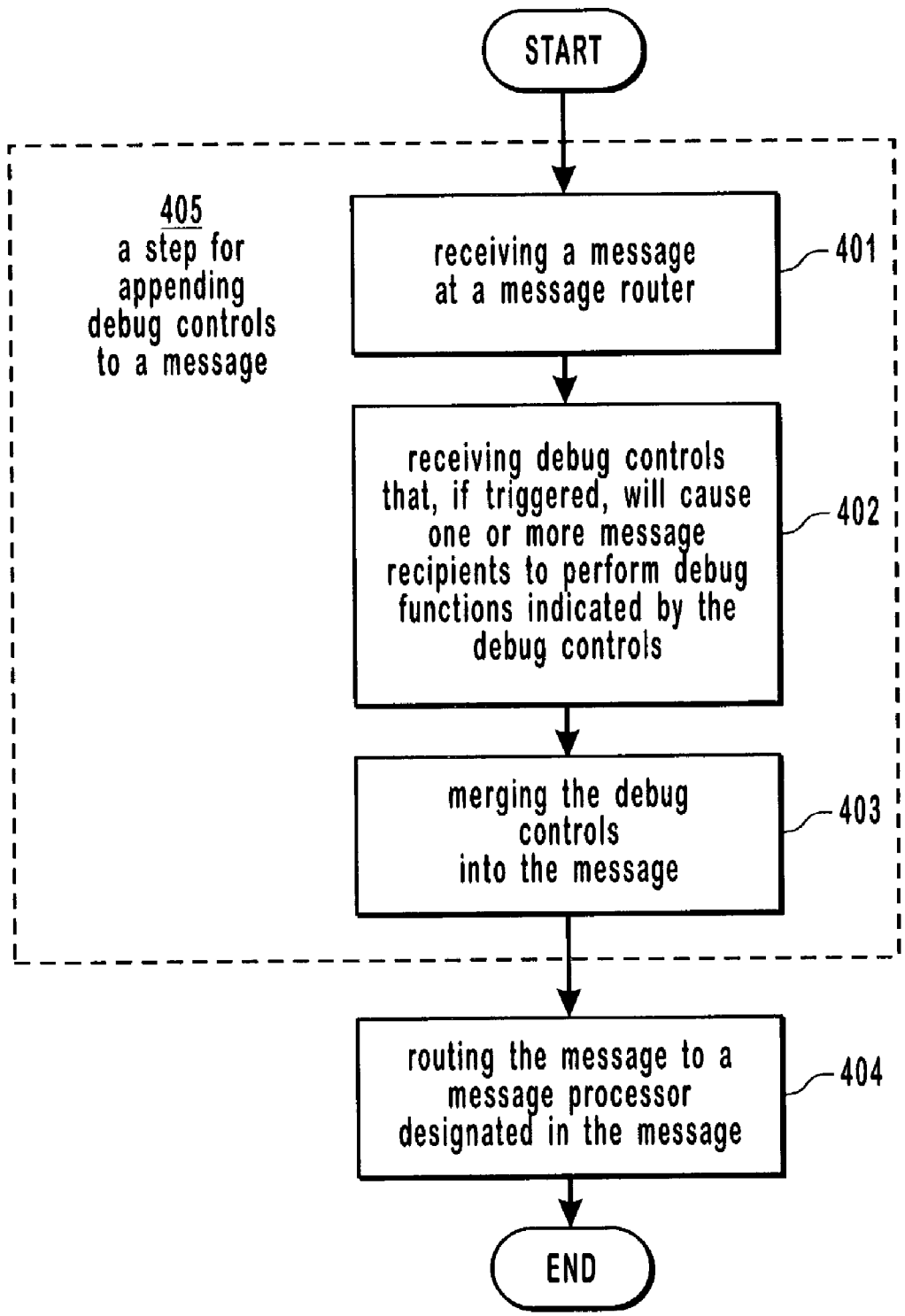
FIG. 4 is a flow diagram illustrating an example of a method for merging debug controls into a message.

FIG. 4 is a flow diagram illustrating an example of a method for inserting debug controls into a message. The method of FIG. 4 will be discussed with reference to the functional components of FIG. 2.

The method in FIG. 4 begins with a functional, result-oriented step for appending debug controls to a message (step 405). Step 405 may be performed so as to include the debug controls along with distributed application data in the message. Step 405 may include any corresponding acts for accomplishing the result of causing debug controls to be appended to a message. However, in the illustrated example of FIG. 4, the step 405 includes a corresponding act of receiving a message at a message router (act 401). This can include message router 230 receiving message 261.

Step 405 includes a corresponding act of receiving debug controls that, if triggered, will cause one or more message recipients to perform debug functions indicated by the debug controls (act 402). This can include debug initiator 220 initiating message 263, inserting debug controls into message 263, and then sending message 263 to message router 230 via logical communication link 272.

In one example embodiment, computer-readable media containing debug controls are maintained at a message processor. When a processed message matches specified attach conditions, debug controls are received from the computer-readable media. For example, message router 230 may maintain computer-readable media containing debug controls. When message 261 is received at message router 230, message router 230 analyzes the circumstances surrounding the reception of message 261 (e.g. current network conditions, time of day, address of a sending message processor, etc.) as well as the characteristics of message 261

(e.g. size, contents, header information, etc.). If specified attach conditions are satisfied (e.g. load conditions are above/below a specified threshold, message 261 is of a specified size, timing conditions are satisfied, etc.) message router 230 receives debug controls from the maintained computer-readable media.

Specified conditions can include specified security requirements. For example, a message processor may need to be "authorized" to insert debug controls to a message. In embodiments that use SOAP envelopes, message processors that are authorized to insert debug controls may have a special license or a license with specific rights. A message processor attaches the license to a SOAP envelope and digitally signs any inserted debug controls to indicate that the message processor is authorized to insert the debug controls. Other message processors that receive the SOAP envelope process the digital signature to determine that the inserted debug controls are authorized debug controls. Different licenses or rights can be assigned to different message processors. More secure message processors, such as, for example, those on an intranet, can be given a more rights than less secure processors, such as, for example, those on an extranet or the Internet.

Alternately, message 263 includes instructions, such as, for example, XML documents, that cause message router 230 to receive debug controls from computer-readable media maintained at message router 230. Instructions can be express instructions that cause message router 230 to receive debug controls from computer-readable media irrespective of any attach conditions.

Step 405 includes a corresponding act of merging the debug controls into the message (act 403). When a message that includes debug controls is received from a debug initiator, a message router can access the debug controls included in the message. For example, message router 230 can access debug controls that were inserted into message 263 by debug initiator 220. Message router 230 "propagates" the debug controls from message 263 to message 261. That is, message router 230 extracts the debug controls from message 263 and appends the debug controls to message 261. When appending debug controls to a message, message router 230 can merge debug controls into an existing debug header of a message or can merge a new debug header into a message. Likewise, message router 230 can merge debug controls that were received from computer-readable media. Merging debug controls into existing messages (e.g. those already including distributed application data) allows debug controls to be expressed without affecting the operation of a distributed application.

The message is routed to a message processor designated in the message (act 404). This can include routing a message to a message processor that is to perform a debug function indicated by the inserted debug controls.

Figure 5:
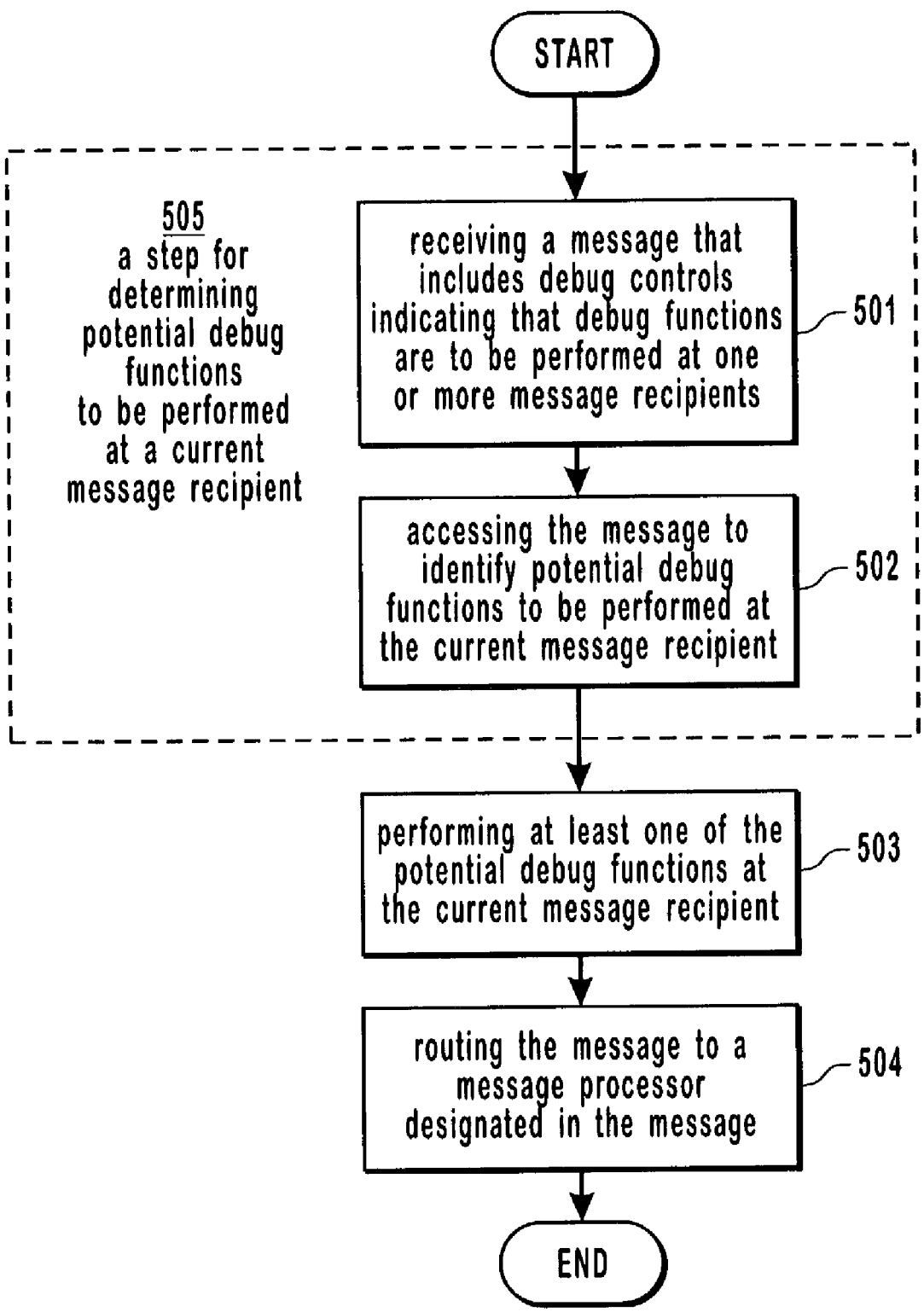
FIG. 5 is a flow diagram illustrating an example of a method for performing a debug function at a message processor.

FIG. 5 is a flow diagram illustrating an example of a method for performing a debug action at a message processor. The method of FIG. 5 will be discussed with reference to the functional components of FIG. 2.

The method in FIG. 5 begins with a functional, result-oriented step for determining potential debug functions to be performed at a current message recipient (step 505). Step 505 may include any corresponding acts for accomplishing the result of determining potential debug functions that are to be performed. However, in the illustrated example of FIG. 5, step 505 includes a corresponding act of receiving a message that includes debug controls indicating debug functions are to be performed at one or more message recipients (act 501).

This includes message recipient 250 receiving message 264. Message 264 may be a message that includes distributed application data along with debug controls indicating debug functions that are to be performed on the distributed application data included in message 264.

Step 505 includes a corresponding act of accessing the message to identify potential debug functions to be performed at the current message recipient (act 502). For example, message recipient 250 can access message 264 to identify debug functions to be performed at message recipient 250. This includes identifying debug controls that are associated with message recipient 250. In some cases, a debugging agent contained in a message processor processes debug headers contained in a message. For example, a debugging agent contained in message recipient 250 can process debug condition attributes to identify debug actions and/or debug responses associated with message recipient 250. Message recipient 250 can also verify security requirements, such as, for example, digital signatures, to determine that inserted debug controls are authorized debug controls. A message processor or debugging agent may invoke instructions, applets, or scripts to cause debug controls to be identified.

Step 505 includes a corresponding act of performing at least one of the potential debug functions at the current message recipient (act 503). Performing debug function may include message recipient 250 performing any of the debug actions or debug responses previously described. It should be understood that previously described debug actions and debug responses are merely examples. It would be apparent to one skilled in the art, after having reviewed this description, that a wide variety of debug actions and/or debug responses, in addition to those previously described, may be performed when implementing the principles of the present invention.

The message is routed to a message processor designated in the message (act 504). It may be that message 264 includes debug controls for debug functions that are to be performed at other message recipients in addition to message recipient 264. As such, message 264 is routed to one of these additional message recipients.

However, it may also be that a message is routed back to a debug initiator. Message recipient 250 may initiate message 265 and then route message 265 to message router 230. Message 265 may be initiated when a portion of a distributed application running at message recipient 250 attempts to communicate with a portion of the distributed application running at message initiator 210. Message 265 can include distributed application data that is to be returned to message initiator 210, as well as information indicative of the results of any debug functions that were performed at message recipient 250. Message router 230 causes debug result data to be routed to debug initiator 220. Debug result data can be included in message 262 and sent from message router 230 to debug initiator 220 via logical communication link 272. Message router 230 causes distributed application data to be routed to message initiator 210. Distributed application data can be included in message 266 and sent from message router 230 to message initiator 210 via logical communication link 210.

In some embodiments, debug result data associated with performed debug functions can be used as input to debugging agents maintained at message processors to configure debug controls that will be inserted/merged into messages. Thus, in some cases, distributed applications are debugged in a "closed loop" environment where output from previous debug functions is used as input to configure future debug controls.

In a first example embodiment, a message containing debug controls is associated with a "message-flow-ID" that represents a particular distributed application. Thus, as the message passes between message processors, each message processor is aware of the distributed application associated with the message. In a second example embodiment, a distributed application may utilize an Application Program Interface ("API"), or other similar mechanism, to indicate which distributed application is associated with a processed message. In either the first or second example embodiments, a distributed system can automatically track the flow of a message. For managed code applications, a virtual machine can track the context of a debug function to determine message flow. For native code, a message can be associated with per-thread storage.

In some embodiments, a distributed application is debugged across a plurality of distrusting but cooperative message processors. Different portions of a distributed application can be managed by different entities, such as, for example, different individuals or corporations. Each entity may cooperate with other entities during execution of the distributed application. For example, a user may initiate a purchase order application on the Website of a book selling entity. The purchase order application may draw money from a banking entity and use a shipping entity for delivery of a purchased book. Thus, the user, the book selling entity, the banking entity, and the shipping entity all cooperate during execution of the purchase order application.

However, for debugging purposes each of these entities may not trust one another. For example, it may be undesirable to allow the user to debug portions of the purchase order application that are managed by the book selling entity and undesirable to allow the book selling entity to debug portions of the purchase order application that are managed by the banking entity. Express rules can be established to control the debug controls an entity can attach to a message. Thus, the express rules can be used to restrict entities from debugging portions of the purchase order application they do not manage.

In some embodiments, a trusted entity is trusted by all other entities to debug all the portions of a distributed application. For example, the user, the book selling entity, the banking entity, and the shipping entity may all trust a debugging entity that is authorized to debug all portions of the purchase order application. Each of the other entities can give the debugging entity authorization to attach debug controls to messages that are processed by portions of the purchase order application that they manage. Different express rules can be established to control what applications a debugging entity can debug and when (e.g. day, time) they can debug the applications.

No central authority is required to manage the express rules. Each individual entity controls a "Web of Trust" that includes trusted entities, what applications the trusted entities can access, and what operations trusted entities can perform on these applications. That is, each entity individual grants debugging authorization to other entities without interfacing to a central authority. Since no central authority is required, an individual entity can more easily update a Web of Trust as the processing and administrative needs of the entity change.

By including debug controls in messages that are already in use by distributed applications, debugging is essentially "built into" an existing messaging infrastructure. Since debug controls may be included in messages that are protocol independent, such as, for example, SOAP envelopes, debug controls may pass through firewalls an/or other security mechanisms. Further, since there is increased control over the amount of data that is returned when debugging a distributed application, the probe effect may be reduced.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. In a distributed system that includes a plurality of message processors and a distributed application having a plurality of portions, the plurality of portions being distributed across the plurality of message processors respectively, the distributed system also including a debug initiator, a computer-implemented method for configuring debug functions that are to be performed to debug the distributed application, the method comprising the following:

an act of accessing a first message that originated at a message initiator, the message initiator including a first portion of the distributed application, the first message configured with distributed application data for at least one other portion of the distributed application;

an act of receiving debug controls in a second message;

an act of propagating the debug controls from the second message into the first message, thereby inserting debug controls for debugging the distributed application into the first message such that the first message includes the distributed application data and the debug controls, the debug controls configured to cause one or more other portions of the distributed application to perform appropriate debug functions for debugging the distributed application, when triggered at any of the one or more other portions of the distributed application; and an act of routing the first message to a further portion of the distributed application designated in the first message such that inserted debug controls flow with distributed application data to a next portion of the distributed application where debug functions are to be performed.

2. The method as recited in claim 1, wherein the act of accessing a first message that originated at a message initiator comprises the following:

an act of accessing a Simple Object Access Protocol envelope.

3. The method as recited in claim 1, wherein the act of accessing a first message that originated at a message initiator comprises the following:

an act of accessing a first message that was transported using a Remote Method Invocation protocol.

4. The method as recited in claim 1, inserting debug controls into the first message comprises the following:

an act of inserting debug controls into a Simple Object Access Protocol envelope.

5. The method as recited in claim 1, wherein inserting debug controls into the message comprises the following:

an act of inserting debug controls into a first message that was transported using a Remote Method Invocation protocol.

6. The method as recited in claim 1, wherein inserting debug controls into the first message comprises the following:
   an act of inserting debug controls into a message header associated with the first message.

7. The method as recited in claim 1, wherein inserting debug controls into the first message comprises the following:
   an act of inserting a debug header into the first message.

8. The method as recited in claim 1, wherein inserting debug controls into the first message comprises the following:
   an act of inserting a debug condition into the first message.

9. The method as recited in claim 1, wherein inserting debug controls into the first message comprises the following:
   an act of inserting a debug action into the first message.

10. The method as recited in claim 1, wherein inserting debug controls into the first message comprises the following:
    an act of inserting a debug response into the first message.

11. The method as recited in claim 1, wherein inserting debug controls into the first message comprises the following:
    an act of inserting an Extensible Markup Language document into the first message.

12. The method as recited in claim 1, wherein inserting debug controls into the first message comprises the following:
    an act of embedding Java scripts into the first message.

13. The method as recited in claim 1, wherein inserting debug controls into the first message comprises the following:
    an act of embedding Java derived language statements into the first message.

14. The method as recited in claim 1, wherein inserting debug controls into the first message comprises the following:
    an act of embedding debug controls into a first message that is transferred in a Common Language Runtime environment.

15. The method as recited in claim 1, wherein inserting debug controls into the first message comprises the following:
    an act of inserting debug controls as a result of receiving feedback from a message processor.

16. The method as recited in claim 1, wherein inserting debug controls into the first message comprises the following:
    an act of inserting debug controls that will cause a message to be suspended.

17. The method as recited in claim 1, wherein inserting debug controls into the first message comprises the following:
    an act of a trusted entity inserting debug controls that, if triggered, will cause a message recipient not managed by the trusted entity to perform a debug function.

18. The method as recited in claim 1, wherein inserting debug controls into the first message comprises the following:
    an act of a license authorizing the insertion of debug controls that, if triggered, will cause a message recipient to perform a debug function.

19. In a distributed system that includes a plurality of message processors and a distributed application having a plurality of portions, the plurality of portions being distributed across the plurality of message processors respectively, the distributed system also including a debug initiator, a computer-implemented method for configuring debug functions that are to be performed to debug the distributed application, the method comprising the following:
    a step for causing debug controls for debugging the distributed application to be appended to a first message so as to include the debug controls along with distributed application data in the message, the distributed application data for at least one other portion of the distributed application and the debug controls being propagated into the first message from a second message; and
    an act of routing the first message to a portion of the distributed application designated in the first message;
    wherein the debug controls are configured to cause one or more other portions of the distributed application to perform appropriate debug functions for debugging the distributed application when triggered at any of the one or more other portions of the distributed application.

20. In a distributed system that includes a plurality of message processors and a distributed application having a plurality of portions, the plurality of portions being distributed across the plurality of message processors respectively, the distributed system also including a message router, a computer-implemented method for configuring debug functions that are to be performed to debug the distributed application, the method comprising the following:
    an act of receiving a first message at the message router, the message router including an intermediary portion of the distributed application, the first message configured with distributed application data for at least one other portion of the distributed application;
    an act of receiving debug controls for debugging the distributed application, the debug controls configured to cause one or more other portions of the distributed application to perform appropriate debug functions for debugging the distributed application, when triggered at any of the one or more other portions of the distributed system;
    an act of propagating the debug controls from a second message into the first message, thereby merging the debug controls into the first message such that the first message includes the distributed application data and the debug controls; and
    an act of routing the first message to a further portion of the distributed application designated in the first message such that inserted debug controls flow with distributed application data to a next portion of the distributed application where debug functions are to be performed.

21. The method as recited in claim 20, wherein the act of receiving a first message at the message router comprises the following:
    an act of receiving a Simple Object Access Protocol envelope.

22. The method as recited in claim 20, wherein the act of receiving a first message at the message router comprises the following:
    an act of receiving a message that was transported using a Remote Method Invocation protocol.

23. The method as recited in claim 20, wherein the act of receiving a first message at the message router comprises the following:
    an act of receiving a first message that includes distributed application data.

24. The method as recited in claim 20, wherein the act of receiving debug controls comprises the following:
an act of receiving a second message that includes debug controls.

25. The method as recited in claim 20, wherein the act of receiving debug controls comprises the following:
an act of receiving a second message including instructions that represent debug controls that are to be received.

26. The method as recited in claim 20, wherein the act of receiving debug controls comprises the following:
an act of receiving debug controls in a second message, the second message being accessed from one or more computer-readable media associated with the message router.

27. The method as recited in claim 20, wherein the act of receiving debug controls comprises the following:
an act of receiving a debug header.

28. The method as recited in claim 20, wherein the act of receiving debug controls comprises the following:
an act of a debugging agent receiving debug controls as a result of an attach condition being satisfied.

29. The method as recited in claim 28, wherein the act of a debugging agent receiving debug controls as a result of an attach condition being satisfied comprises the following:
an act of a debugging agent receiving debug controls as a result of executed instructions determining that an attach condition is satisfied.

30. The method as recited in claim 20, wherein the act of receiving debug controls comprises the following:
an act of a receiving debug controls that were authorized by a license agreement.

31. The method as recited in claim 20, wherein the act of receiving debug controls comprises the following:
an act of a receiving debug controls at a first entity that is trusted to test a second entity.

32. The method as recited in claim 20, wherein merging the debug controls into the first message comprises the following:
an act of merging debug controls from one or more computer-readable media associated with a message processor into the first message.

33. The method as recited in claim 20, wherein merging the debug controls into the first message comprises the following:
an act of merging a debug header into the first message.

34. The method as recited in claim 20, wherein merging the debug controls into the first message comprises the following:
an act of merging a debug condition into the first message.

35. The method as recited in claim 20, wherein merging the debug controls into the first message comprises the following:
an act of merging a debug action into the first message.

36. The method as recited in claim 20, wherein merging the debug controls into the first message comprises the following:
an act of merging a debug response into the first message.

37. The method as recited in claim 20, wherein merging the debug controls into the first message comprises the following:
an act of a debugging agent merging debug controls into the first message as a result of an attach condition being satisfied.

38. The method as recited in claim 20, wherein merging the debug controls into the first message comprises the following:
an act of a merging debug controls that were authorized by a license agreement.

39. The method as recited in claim 20, wherein merging the debug controls into the first message comprises the following:
an act of a trusted entity merging debug controls that will debug a portion of a distributed application that is not managed by the trusted entity.

40. In a distributed system that includes a plurality of message processors and a distributed application having a plurality of portions, the plurality of portions being distributed across the plurality of message processors respectively, the distributed system also including a message router, a computer-implemented method for configuring debug functions that are to be performed to debug the distributed application, the method comprising the following:
a step for appending debug controls for debugging the distributed application to a first message so as to include the debug controls along with distributed application data in the first message, the distributed application data for at least one other portion of the distributed application and the debug controls being propagated into the first message from a second message; and
an act of routing the first message to a portion of the distributed application designated in the first message;
wherein the debug controls are configured to cause one or more other portions of the distributed application to perform appropriate debug functions for debugging the distributed application when triggered at any of the one or more other portions of the distributed application.

41. In a distributed system that includes a plurality of message processors and a distributed application having a plurality of portions, the plurality of portions being distributed across the plurality of message processors respectively, the distributed system also including a current message recipient, a computer-implemented method for debugging a portion of the distributed application at the current message recipient, the method comprising the following:
an act of receiving a message that includes debug controls for debugging the distributed application along with application data for the current message recipient and at least one other portion of the distributed application, the debug controls configured to cause one or more other portions of the distributed application to perform appropriate debugging functions for debugging the distributed application, when triggered at any of the one or more other portions of the distributed application, the debug controls having been merged into the message from a second message;
an act of accessing the received message to identify any debug controls configured to cause the current message recipient to perform appropriate debugging functions for debugging the distributed application;
an act of performing at least one appropriate debugging function at the current message recipient to assist in debugging the distributed application, debugging the distributed application including debugging portions at other message processors; and
an act of routing the received message to a further portion of the distributed application designated in the received message such that debug controls flow with distributed application data to a next portion of the distributed application where debug functions are to be performed.

42. The method as recited in claim 41, wherein the act of receiving a message that includes debug controls comprises the following:

an act of receiving a Simple Object Access Protocol envelope.

43. The method as recited in claim 41, wherein the act of receiving a message that includes debug controls comprises the following:
an act of receiving a message that was transported using a Remote Method Invocation protocol.

44. The method as recited in claim 41, wherein the act of receiving a message that includes debug controls comprises the following:
an act of receiving a message that includes distributed application data along with debug controls.

45. The method as recited in claim 41, wherein the act of receiving a message that includes debug controls comprises the following:
an act of receiving a message that includes a message-flow-ID that designates the message as being associated with a particular distributed application.

46. The method as recited in claim 41, wherein the act of receiving a message that includes debug controls comprises the following:
an act of calling an Application Program Interface to determine a particular distributed application that is associated with the received message.

47. The method as recited in claim 41, wherein the act of receiving a message that includes debug controls comprises the following:
an act of receiving a message that includes embedded Java scripts.

48. The method as recited in claim 41, wherein the act of receiving a message that includes debug controls comprises the following:
an act of receiving a message that includes embedded Java derived language statements.

49. The method as recited in claim 41, wherein the act of receiving a message that includes debug controls comprises the following:
an act of receiving a message that was transferred in a Common Language Runtime environment.

50. The method as recited in claim 41, wherein the act of accessing the received message to identify any debug controls configured to cause the current message recipient perform appropriate debugging functions comprises the following:
an act of accessing the received message to identify debug headers included in the received message.

51. The method as recited in claim 41, wherein the act or accessing the received message to identify any debug controls configured to cause the current message recipient perform appropriate debugging functions comprises the following:
an act of accessing the received message to identify debug controls associated with the current message recipient and one or more other portions of the distributed application at corresponding one or more other message processors respectively.

52. The method as recited in claim 41, wherein the act of accessing the received message to identify any debug controls configured to cause the current message recipient perform appropriate debugging functions comprises the following:
an act of invoking embedded Java scripts to identify debug controls associated with the current message recipient.

53. The method as recited in claim 41, wherein the act of accessing the received message to identify any debug controls configured to cause the current message recipient perform appropriate debugging functions comprises the following:
an act of invoking Java derived language statements to identify debug controls associated with the current message recipient.

54. The method as recited in claim 41, wherein the act of accessing the received message to identify any debug controls configured to cause the current message recipient perform appropriate debugging functions comprises the following:
an act of invoking instructions included in a message that was transferred in a Common Language Runtime environment to identify debug controls associated with the current message recipient.

55. The method as recited in claim 41, wherein the act of performing am least one appropriate debugging function at the current message recipient comprises the following:
an act of determining that a condition is satisfied.

56. The method as recited in claim 41, wherein the act of performing at least one appropriate debugging function at the current message recipient comprises the following:
an act of performing a debug action.

57. The method as recited in claim 41, wherein the act of performing at least one appropriate debugging function at the current message recipient comprises the following:
an act of performing a debug response.

58. The method as recited in claim 41, wherein the act of performing at least one appropriate debugging function at the current message recipient comprises the following:
an act of suspending the received message at the current message recipient.

59. The method as recited in claim 41, wherein the act of performing at least one appropriate debugging function at the current message recipient comprises the following:
an act of invoking Java scripts to perform at least one of the potential debug functions.

60. The method as recited in claim 41, wherein the act of performing at least one appropriate debugging function at the current message recipient comprises the following:
an act of invoking Java derived language statements to perform at least one of the potential debug functions.

61. The method as recited in claim 41, wherein the act of performing at least one appropriate debugging function at the current message recipient comprises the following:
an act of invoking instructions included in a message that was transferred in a Common Language Runtime environment to perform at least one of the potential debug functions.

62. The method as recited in claim 41, wherein the act of routing the message to a further portion of the distributed application designated in the received message comprises the following:
an act of routing the received message to a debug initiator.

63. The method as recited in claim 41, wherein the act of routing the message to a further portion of the distributed application designated in the received message comprises the following:
an act of routing the received message based on a message-flow-ID included in the received message.

64. The method as recited in claim 41, further comprising:
an act of inserting debug results, which were generated as a result of performing the at least one of the debug functions, into the received message.

65. The method as recited in claim 41, further comprising:
an act of inserting debug results, which were generated as a result of performing the at least one of debug functions, into a third message.

66. The method as recited in claim 65, further comprising: an act of routing the third message to a debug initiator.

67. A computer program product for use in a distributed system that includes a plurality of message processors and a distributed application having a plurality of portions, the plurality of portions being distributed across the plurality of message processors respectively, the distributed system also including a debug initiator, the computer program product for implementing a method for configuring debug functions that are to be performed to debug the distributed application, the computer program product comprising the following:
one or more physical computer-readable media carrying computer-executable instructions, that when executed at the debug initiator, cause the debug initiator to perform the method, including:
accessing a first message that originated at a message initiator, the message initiator including a first portion of the distributed application, the first message configured with distributed application data for at least one other portions of the distributed application;
receiving debug controls in a second message;
propagating the debug controls from the second message into the first message, thereby inserting debug controls for debugging the distributed application into the first message such that the first message includes the distributed application data and the debug controls, the debug controls configured to cause one or more other portions of the distributed application to perform appropriate debug functions for debugging the distributed application, when triggered at any of the one or more other portions of the distributed system; and
routing the first message to a further portion of the distributed application designated in the first message such that inserted debug controls flow with distributed application data to a next portion of the distributed application where debug functions are to be performed.

68. The computer program product as recited claim 67, wherein the one or more computer-readable media are system memory.

69. A computer program product for use in a distributed system that includes a plurality of message processors and a distributed application having a plurality of portions, the plurality or portions being distributed across the plurality of message processors respectively, the distributed system also including a message router, the computer program product for implementing a method for configuring debug functions that are to be performed to debug the distributed application, the computer program product comprising the following:
one or more physical computer-readable media carrying computer-executable instructions, that when executed at the message router, cause the message router to perform the method, including:
receiving a first message at the message router, the message router including an intermediary portion of the distributed application, the first message configured with distributed application data for at least one other portion of the distributed application;
receiving debug controls for debugging the distributed application, the debug controls configured to cause one or more other portions of the distributed application to perform appropriate debug functions for debugging the distributed application; when triggered at any of the one or more other portions of the distributed system;
propagating the debug controls from a second message into the first message, thereby merging the debug controls into the first message such that the first message includes the distributed application data and the debug controls; and
routing the first message to a further portion of the distributed application designated in the first message such that inserted debug controls flow with distributed application data to a next portion of the distributed application where debug functions are to be performed.

70. The computer program product as recited claim 69, wherein the one or more computer-readable media are system memory.

71. A computer program product for use in a distributed system that includes a plurality of message processors and a distributed application having a plurality of portions, the plurality of portions being distributed across the plurality of message processors respectively, the distributed system also a current message recipient, the computer program product for implementing a method for debugging a portion of the distributed application, the computer program product comprising the following:
one or more physical computer-readable media carrying computer-executable instructions, that when executed at the current message recipient, cause the current message recipient to perform the method, including:
receiving a message that includes debug controls for debugging the distributed application along with application data for the current message recipient and at least one other portion of the distributed application, the debug controls configured to cause one or more other portions of the distributed application to perform appropriate debugging functions for debugging the distributed application when triggered at any of the one or more other portions of the distributed application, the debug controls having been merged into the message from a second message;
accessing the received message to identify any debug controls configured to cause the current message recipient to perform appropriate debugging functions for debugging the distributed application;
performing an identified debug function to assist in debugging the distributed application, debugging the distributed application including debugging portions at other message processors; and
routing the received message to a further portion of the distributed application in the received message such that inserted debug controls flow with distributed application data to a next portion of the distributed application where debug functions are to be performed.

72. The computer program product as recited claim 71, wherein the one or more computer-readable media are system memory.

73. A computer network comprising the following:
a plurality of message processors and a distributed application having a plurality of portions, the plurality of portions being distributed across the plurality of message processors respectively;
a message initiator including a portion of the distributed application, the message initiator configured to initiate a first message that includes distributed application data for one or more other portions of the distributed application; and a debug initiator that is network connectable to the message initiator and configured to access the first message and propagate debug controls from a second message into the first message to thereby insert debug controls for debugging the distributed application into the first message, the debug controls configured to cause one or more portions of the distributed application to perform appropriate debug functions for debugging the distributed application when triggered at any of the one or more portions of the distributed application.

74. The method as recited in claim 1, wherein the act of inserting debug controls for debugging the distributed application into the first message comprises an act of inserting debug controls for debugging a plurality of different portions of the distributed application resident at different message processors such that the plurality of different portions of the distributed application perform at least one debug function as part of debugging the distributed application.

75. The method as recited in claim 41, further comprising:

an act of inserting output from performing the at least one appropriate debug function into the received message prior to routing the message, the output from the at least one appropriate debug function to be used as input for subsequently performed debug functions at least at the further portion of the distributed application.

* * * * *